(12) United States Patent
Fang et al.

(10) Patent No.: US 8,683,039 B2
(45) Date of Patent: Mar. 25, 2014

(54) METHOD, APPARATUS AND COMMUNICATION SYSTEM FOR ENABLING TERMINAL TO BE MANAGED BY MULTIPLE SERVERS

(75) Inventors: Ping Fang, Shenzhen (CN); Huangwei Wu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 138 days.

(21) Appl. No.: 13/182,816

(22) Filed: Jul. 14, 2011

(65) Prior Publication Data

US 2011/0276668 A1  Nov. 10, 2011

Related U.S. Application Data

(63) Continuation of application No. PCT/CN2009/075430, filed on Dec. 9, 2009.

(30) Foreign Application Priority Data

Jan. 15, 2009  (CN) .......................... 2009 1 0000569

(51) Int. Cl.
   *G06F 13/00*  (2006.01)
(52) U.S. Cl.
   USPC ................ 709/225; 709/229; 709/250; 718/1
(58) Field of Classification Search
   USPC ............... 709/223, 225, 227, 229, 250; 718/1
   See application file for complete search history.

(56) References Cited

U.S. PATENT DOCUMENTS

| | | | |
|---|---|---|---|
| 6,553,408 B1 * | 4/2003 | Merrell et al. ................ | 709/213 |
| 7,606,140 B2 * | 10/2009 | Golla ............................ | 370/216 |
| 7,607,140 B2 * | 10/2009 | Kato et al. .................... | 719/321 |
| 7,730,205 B2 * | 6/2010 | Rothman et al. .............. | 709/238 |
| 8,201,166 B2 * | 6/2012 | Garrett et al. ..................... | 718/1 |
| 2006/0120305 A1 | 6/2006 | Van Den Bosch et al. | |
| 2008/0133717 A1 | 6/2008 | Bouchat et al. | |
| 2010/0165877 A1 * | 7/2010 | Shukla et al. ................. | 370/254 |

FOREIGN PATENT DOCUMENTS

| | | |
|---|---|---|
| CN | 1863145 A | 11/2006 |
| CN | 101127631 A | 2/2008 |
| CN | 101192996 A | 6/2008 |
| CN | 101291248 A | 10/2008 |
| EP | 1928186 A1 | 6/2008 |
| WO | WO 2006/122487 A1 | 11/2006 |

OTHER PUBLICATIONS

European Patent Office Communication pursuant to Rule 62 EPC, the supplementary European search report (Art. 153(7) EPC) and the European search opinion for Application No. 09838147.8-1244, mailed Mar. 23, 2012, Huawei Devices Co., Ltd.

(Continued)

*Primary Examiner* — Viet Vu
(74) *Attorney, Agent, or Firm* — Conley Rose, P.C.; Grant Rodolph; Nicholas K. Beaulieu

(57) ABSTRACT

A method, an apparatus, and a communication system for enabling a terminal to be managed by multiple servers are disclosed. The method includes: receiving, by a terminal, configuration information sent by a first server; generating a virtual device according to the configuration information; receiving management information from a second server; and managing the virtual device according to the management information. The terminal generates a virtual device locally so that the terminal can be managed by multiple servers; or the range of servers that manage the terminal is widened in the terminal, and the data model in the terminal is set so that multiple servers can manage one terminal.

12 Claims, 8 Drawing Sheets

(56) References Cited

OTHER PUBLICATIONS

Royon, Y. et al.; Virtualization of Service Gateways in Multi-provider Environments; CBSE 2006, LNCS 4063, pp. 385-392, 2006.

Royon, Y. et al.; Multiservice Home Gateways: Business Model, Execution Environment, Management Infrastructure; IEEE Communications Magazine, Oct. 2007.

XP-002493850; Broadband Forum Technical Report; TR-069 CPE WAN Management Protocol v.1.1; Version: Issue 1 Amendment 2; Version Date: Dec. 2007.

XP-002624032; Open Mobile Alliance; "OMA Device Management Tree and Description"; OMA-TS-DM_TND-V1_2-20070209-A; 2007.

Ibáñez, M et al.; "Virtualization of Residential Gateways" Universidad Carlos III de Madrid, Leganés, Spain; Intelligent Solutions in Embedded Systems, 2007 Fifth Workshop 2007.

Husain, S. et al.; "Remote Device Management of WiMAX Devices in Multi-Mode Multi-Access Environment"; Broadband Multimedia Systems and Broadcasting, 2008 IEEE International Symposium on.

Second Chinese Office Action mailed Jun. 18, 2012, issued in related Chinese Application No. 200910000569.7, Huawei Technologies Co., Ltd. (13 pages).

DSL Forum Working Text, Draft, "CWMP Scalability Extensions WT-148", Version 6, pp. 1-31, 2008.

DSL Forum Technical Report, "TR-069 CPE WAN Management Protocol v1.1", Version: Issue 1 Amendment 2, pp. 1-138, (Dec. 2007).

Broadband Forum Technical Report, "TR-098 Internet Gateway Device Data Model for TR-069", Issue: 1 Amendment 2, pp. 1-239, (Sep. 2008).

International Search Report from the Chinese Patent Office for International Application No. PCT/CN2009/075430 mailed Mar. 25, 2010.

Written Opinion of the International Searching Authority in International Application No. PCT/CN2009/075430 mailed Mar. 25, 2010.

First Chinese Office Action of Chinese Application No. 200910000569.7 mailed Aug. 23, 2011.

DSL Forum Working Text WT-107, Version 16, "TR-098 Issue 2 for DSLHome Technical Working Group", pp. 1-271, (Oct. 2007).

Foreign Communication From a Counterpart Application, Chinese Application 200910000569.7, Chinese Office Action dated Jan. 22, 2013, 7 pages.

Foreign Communication From a Counterpart Application, Chinese Application 200910000569.7, Partial Translation of Chinese Office Action dated Jan. 22, 2013, 11 pages.

* cited by examiner

METHOD, APPARATUS AND COMMUNICATION SYSTEM FOR ENABLING TERMINAL TO BE MANAGED BY MULTIPLE SERVERS

CROSS-REFERENCE TO RELATED APPLICATIONS

This application is a continuation of International Application No. PCT/CN2009/075430, filed on Dec. 9, 2009, which claims priority to Chinese Patent Application No. 200910000569.7, filed on Jan. 15, 2009, both of which are hereby incorporated by reference in their entireties.

FIELD OF THE INVENTION

The present invention relates to communication technologies, and in particular, to a method, an apparatus, and a communication system for enabling a terminal to be managed by multiple servers.

BACKGROUND OF THE INVENTION

Digital Subscriber Line (DSL) is a broadband access technology widely applied in broadband access of home users. Through various applications based on the broadband access technology, a home user can obtain different types of services provided by different service providers, for example, Voice on Internet Protocol (VoIP) and Internet Protocol Television (IPTV). Therefore, the home user needs to have various IP-based terminal devices. The application terminals based on an IP network and applied at home are known as Customer Premises Equipment (CPE) in the DSL Forum. The DSL Forum also stipulates that the CPE is configured and managed at the network side to make the CPE work normally and reduce the work of the user in configuring and managing the CPE. The network entity for configuring and managing the CPE may be an Automatic Configuration Server (ACS). The ACS may modify and set the parameters in the CPE through Remote Procedure Call (RPC).

With emergence of new services, a single user subscribes to a variety of services provided by different service providers. In a home network, broadband network access terminals are connected to CPEs managed by the ACSs of different service providers, for example, Set Top Box (STB) and VoIP phone. To enable the CPEs connected to the terminal access devices to work normally, the ACSs of different service providers need not only to manage the service devices such as STB and VoIP phone, but also to configure and manage the terminal access devices, for example, configuring the NAT mapping, setting Quality of Service (QoS), and performing cross authentication. Therefore, the terminal access devices such as Home Gateway (HGW) need not only to accept configuration and management provided by the access service provider, but also to accept configuration and management provided by the service provider. That is, a single home HGW needs to be configured and managed by different ACSs.

In the process of developing the present invention, the inventor finds at least the following problems in the prior art:

The prior art does not enable multiple servers of multiple service providers to configure and manage the same CPE. The CPE may be a terminal device such as an HGW.

SUMMARY OF THE INVENTION

The embodiments of the present invention provide a method, an apparatus, and a communication system for enabling a terminal to be managed by multiple servers so that the multiple servers of multiple service providers can configure and manage the same terminal.

In an aspect, a method for enabling a terminal to be managed by multiple servers is provided. The method includes:

receiving, by the terminal, configuration information sent by a first server;

generating a virtual device according to the configuration information;

receiving management information from a second server; and managing the virtual device according to the management information.

In another aspect, another method for enabling a terminal to be managed by multiple servers is provided. The method includes:

receiving, by the terminal, setting information sent by a first server, where the setting information includes at least information of setting an address and/or rights of a second server;

setting the terminal according to the setting information;

receiving configuration and management information sent by the second server; and configuring and managing the terminal as indicated by the second server according to the configuration and management information.

In another aspect, a gateway is provided. The gateway includes:

a receiving unit, configured to receive configuration information sent by a first server and management information sent by a second server;

a virtual gateway generating unit, configured to generate a virtual gateway according to the configuration information; and a configuring unit, configured to manage the virtual gateway according to the management information.

In another aspect, another gateway is provided. The gateway includes:

a first receiving unit, configured to receive information of managing a data model in the gateway from a first server and receive information of configuring and managing the gateway from a second server;

a data model managing unit, configured to manage the data model in the gateway according to the information received by the first receiving unit for managing the data model; and a first configuring unit, configured to configure and manage the gateway which has the data model managed by the data model managing unit according to the configuration and management information received by the first receiving unit from the second server.

In another aspect, a server is provided. The server includes:

a second receiving unit, configured to receive information about a modified parameter sent by a gateway;

a second judging unit, configured to judge whether the modified parameter of the gateway conflicts with each other; and a second sending unit, configured to send information of modifying the parameter of the gateway to the gateway according to the preset information if the second judging unit determines that the conflict exists.

In another aspect, a communication system is provided. The communication system includes:

a first server, configured to send information of managing a data model in a gateway;

a second server, configured to send information of configuring and managing the gateway with respect to services of the server, and receive information about a modified parameter from the gateway; and the gateway, configured to receive the information of managing the data model in the gateway from the first server and the information of configuring and managing the gateway from the second server, manage the data model in the gateway according to the information of managing the data model in the gateway from the first server, and configure and manage the gateway according to the information of configuring and managing the gateway from the second server.

Through the method, the apparatus, and the communication system for enabling a terminal to be managed by multiple servers herein, the terminal generates a virtual device locally so that the terminal can be managed by multiple servers; or the range of servers that manage the terminal is widened in the terminal, and the data model in the terminal is set so that multiple servers can manage one terminal. In this way, multiple servers can manage one CPE.

BRIEF DESCRIPTION OF THE DRAWINGS

To make the technical solution under the present invention or in the prior art clearer, the following briefly describes the accompanying drawings involved in the description of the embodiments of the present invention or the prior art. Apparently, the accompanying drawings described below are illustrative rather than exhaustive, and persons of ordinary skill in the art can derive other drawings from the accompanying drawings without any creative effort.

DETAILED DESCRIPTION OF THE EMBODIMENTS

The embodiments of the present invention provide a method, an apparatus, and a communication system for enabling a terminal to be managed by multiple servers so that multiple servers of multiple service providers can configure and manage the same terminal, as described below through examples.

Embodiment 1

Figure 1:
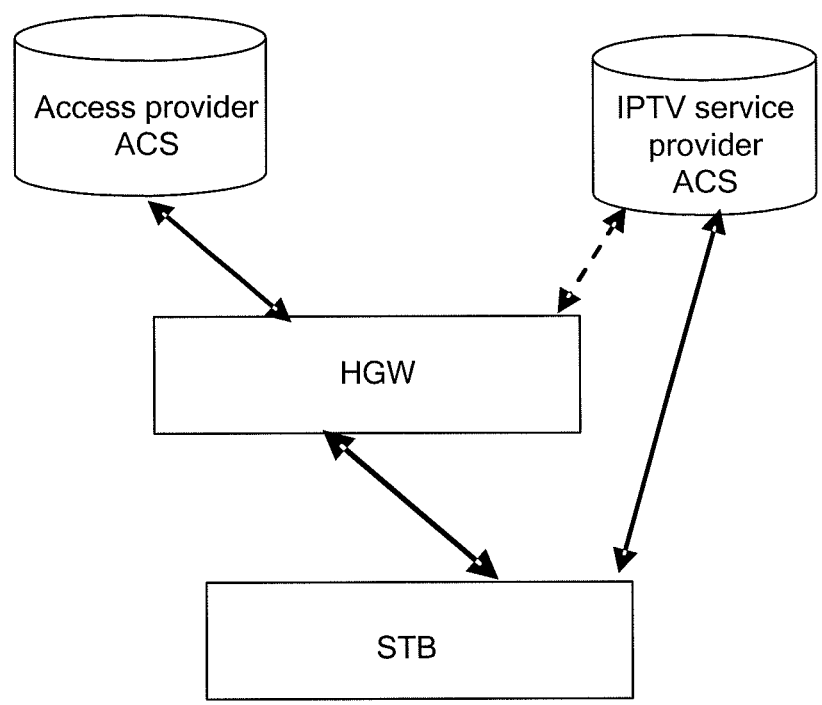
FIG. 1 is a networking diagram of a terminal in a technical solution according to an embodiment of the present invention.
Figure 2:
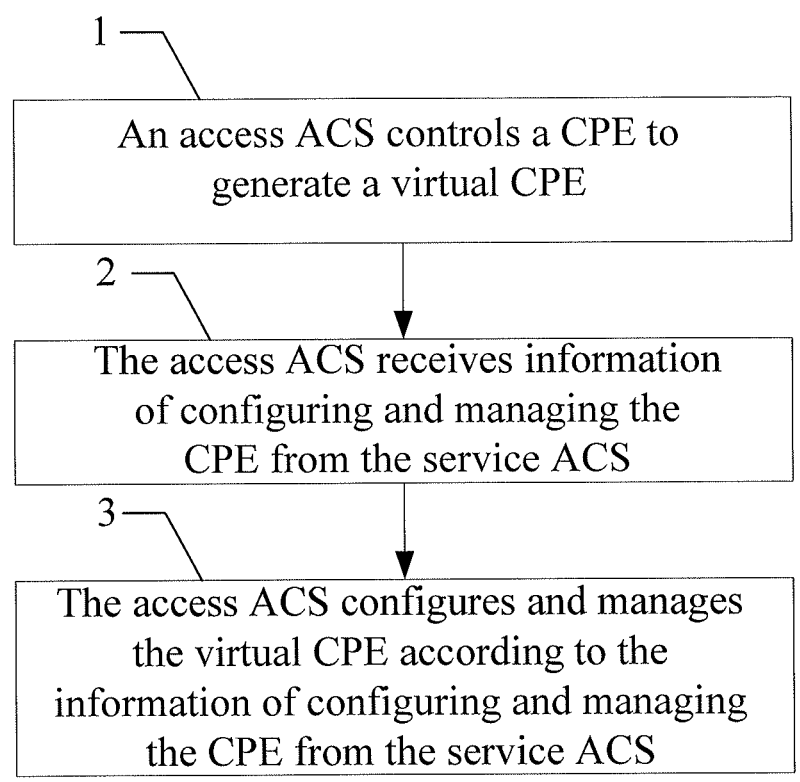
FIG. 2 is a flow chart of a method according to Embodiment 1 of the present invention.

As shown in FIG. 2, a method for enabling a terminal to be managed by multiple servers includes the following steps:

Step 1: An access ACS controls a CPE to generate a virtual CPE according to a protocol agreed with a service ACS.

The number of service ACSs involved may be one or multiple. In the case of multiple service ACSs, the access ACS controls the HGW to generate the virtual CPE corresponding to each service ACS respectively according to the protocol agreed with each service ACS. A data model in each generated virtual CPE is composed of service-related parameters and objects, such as Network Address Translation (NAT) mapping table entries, Quality of Service (QoS), and Uniform Resource Locator (URL) of a management server. The parameters in the data model need to be negotiated by a service provider and an access provider. In this document, the access ACS is also known as a first server, and the service ACS is also known as a second server.

In step 1, the access ACS may use a Remote Procedure Call (RPC) method to control the CPE to generate the virtual CPE.

Step 2: Receive information of configuring and managing the CPE from the service ACS.

Step 3: The service ACS configures and manages the virtual CPE in the CPE according to the information of configuring and managing the CPE from the service ACS.

In step 3, the service ACS may use TR-069 to configure and manage the virtual CPE in the same way as managing a CPE independently.

In the method for enabling a terminal to be managed by multiple servers according to Embodiment 1, a virtual CPE is generated in the CPE, and therefore, the service ACS configures and manages the virtual CPE, and multiple service ACSs can configure and manage their corresponding virtual CPE. In this way, multiple servers configure and manage the same terminal. Through this method, the service ACS can configure the virtual CPE dynamically anytime, and the service ACS configures and manages the CPE according to the existing management specifications.

Embodiment 2

Figure 3:
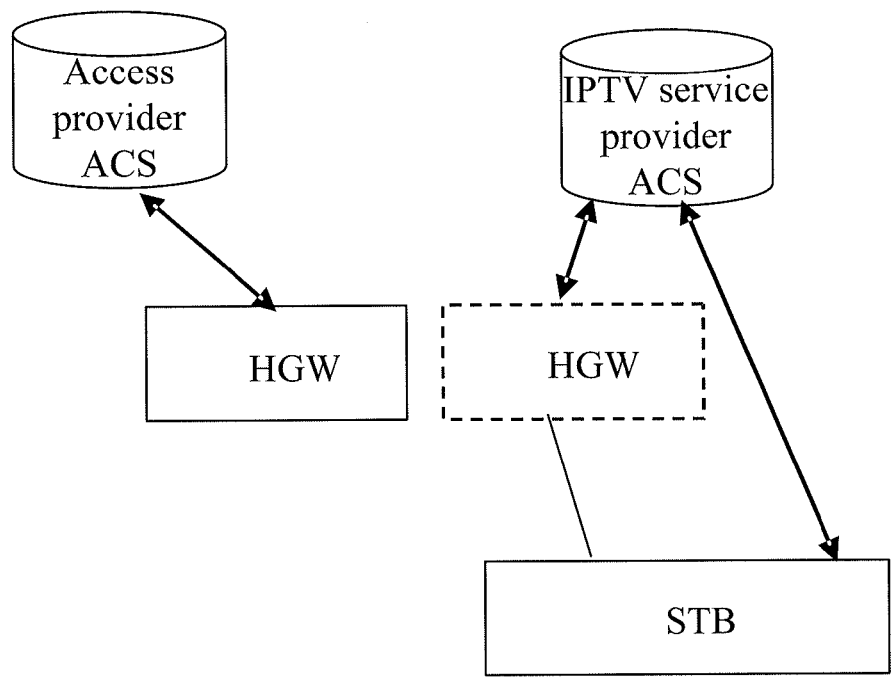
FIG. 3 is a networking diagram of an HGW with a virtual HGW according to Embodiment 2 of the present invention.

A method for enabling a terminal to be managed by multiple servers is provided in this embodiment. This method is more detailed than the method provided in Embodiment 1. In this embodiment, an ACS of an access network provider such as China Telecom (referred to as "China Telecom ACS" below) serves as an access ACS, and an IPTV ACS of an IPTV service provider serves as a service ACS. Assuming that a CPE is an HGW, the method is detailed below: As shown in FIG. 3, in this method, the China Telecom ACS controls the HGW to generate a virtual HGW according to a protocol agreed between the IPTV service provider and China Telecom. The IPTV ACS is entitled to access and manage only the generated virtual HGW, but not entitled to manage parameters other than the data model in the virtual HGW.

Figure 4:
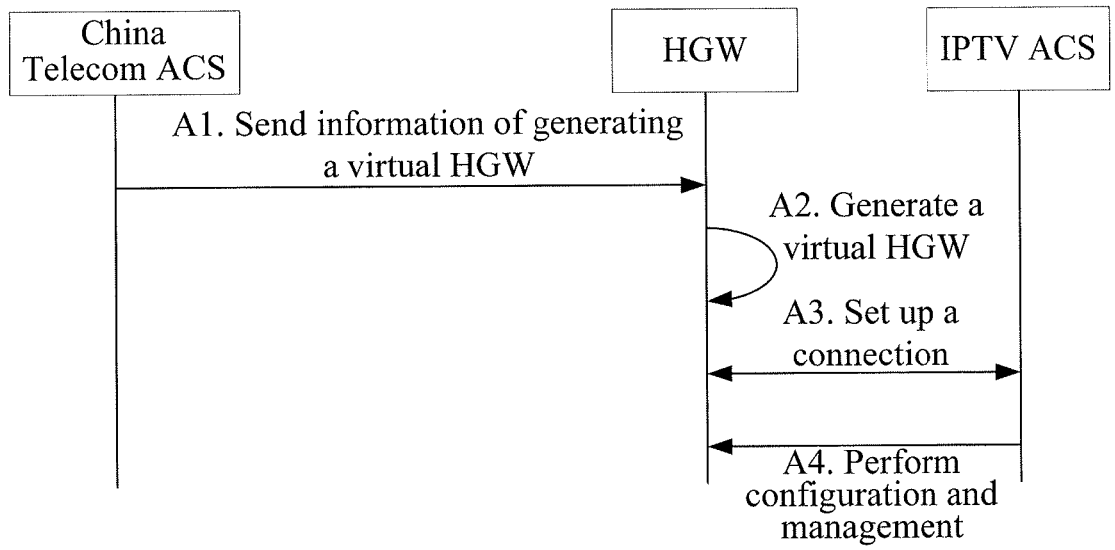
FIG. 4 is a flow chart of a method according to Embodiment 2 of the present invention.

As shown in FIG. 4, the method includes the following steps:

Step A1: The China Telecom ACS sends information of controlling the HGW to generate the virtual HGW to the HGW according to the protocol agreed between China Telecom and the IPTV service provider.

In step A1, if a user wants to use a service provided by the IPTV service provider, this service needs to be activated by China Telecom first. The IPTV ACS information negotiated between the IPTV service provider and China Telecom is stored in the China Telecom ACS, and the IPTV ACS information includes: The China Telecom ACS allows the IPTV ACS to have a high QoS priority in the HGW; except the high QoS priority in the HGW, the IPTV ACS does not care about configuration of other parameters of the HGW; and the China Telecom ACS can read the QoS information set by the IPTV ACS in the HGW.

Step A2: The HGW receives information sent by the China Telecom ACS and generates a virtual HGW.

Figure 5:
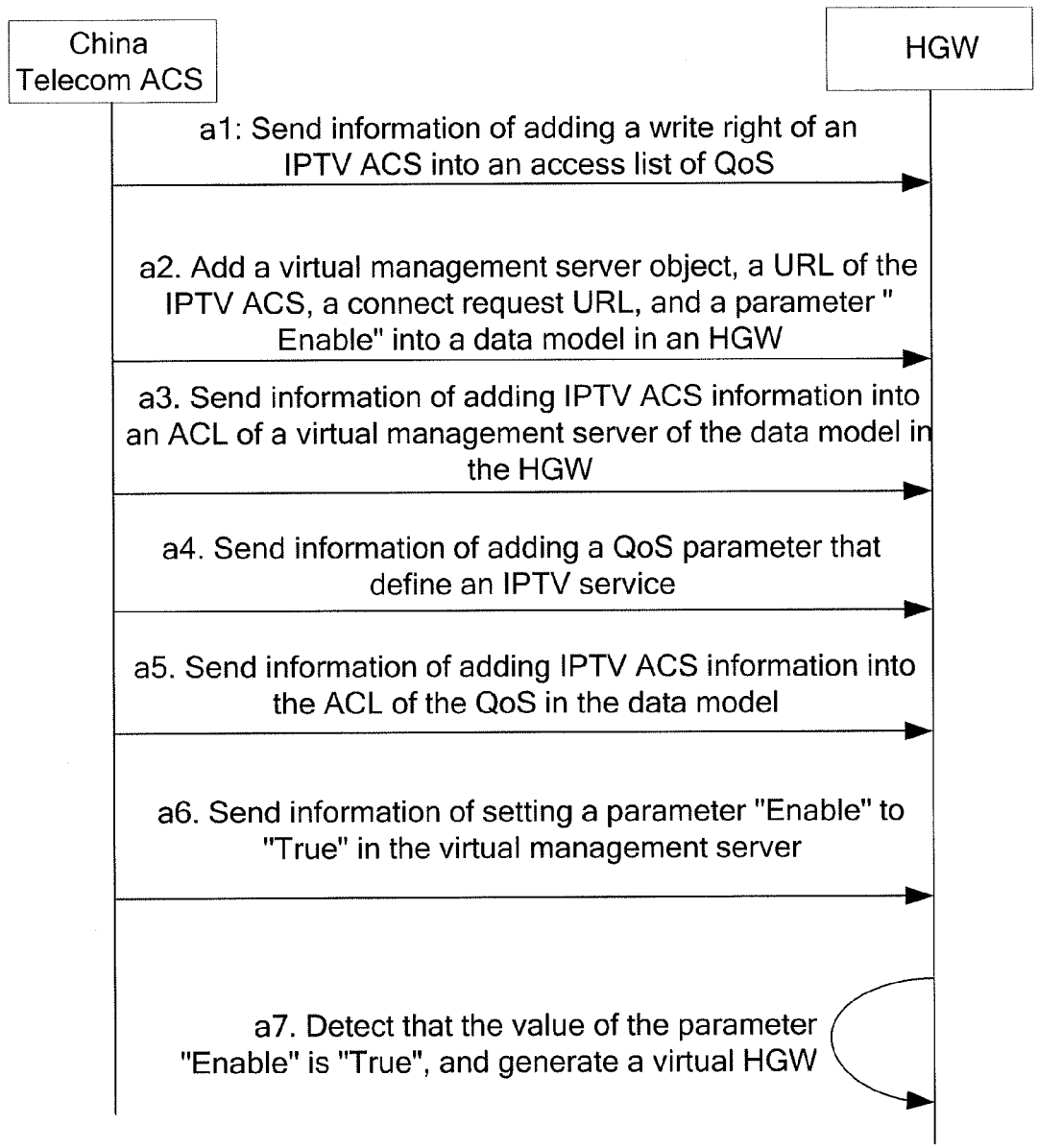
FIG. 5 is a flow chart of a method for generating a virtual HGW according to Embodiment 2 of the present invention.

As shown in FIG. 5, step A2 may specifically include:

Step a1: The HGW receives information sent by the China Telecom ACS for adding a write right into a QoS parameter access list, and adds the write right of the IPTV ACS into the QoS parameter access list.

After step a1 is performed, the IPTV ACS is entitled to control the QoS parameter completely in the virtual HGW; by default, for other parameters, the IPTV ACS has only the right of reading them.

Step a2: The HGW receives information sent by the China Telecom ACS as an instruction of adding a virtual management server object, adding a URL of the IPTV ACS, adding a URL of a connection request (referred to as "connection request URL" below), and adding a parameter "Enable", into the data model in the HGW. The HGW adds the virtual management server object, the URL of the IPTV ACS, the connection request URL, and the parameter "Enable" into the data model in the HGW according to the received information.

Table 1 shows a data model in the HGW after such content is added. For the description about the IPTV ACS URL and the connection request URL in the data model, see the description in Table 1.

Step a3: The HGW receives information sent by the China Telecom ACS for adding IPTV ACS information into an Access Control List (ACL) of a virtual management server in the HGW data model, and adds the IPTV ACS information into the ACL of the virtual management server in the data model according to the received information.

In step a3, the IPTV ACS information is added into the ACL of the virtual management server in the data model so that the IPTV ACS is entitled to access the data model in the HGW.

For the purpose of adding the IPTV ACS information into the ACL of the virtual management server in the data model, the HGW does not necessarily receive the information sent by the China Telecom ACS. Instead, after the parameters are added to the data model in step a2, the HGW is triggered to add the IPTV ACS information into the ACL of the virtual management server in the data model.

Step a4: The HGW receives information sent by the China Telecom ACS for adding QoS parameters which define the IPTV service, and records the received QoS parameters into a QoS list in the data model.

The QoS parameters for defining the IPTV service in step a4 may be: Internet gateway device, queue management, classification, and so on. The first row of Table 2 is a new QoS parameter added for defining the IPTV service.

TABLE 1

| Name | Type | Write | Description | Object Default | Version |
|---|---|---|---|---|---|
| Internet gateway device management server | Object | — | This object includes parameters of a CPE-related ACS. | — | 1.0 |
| ... | | | | | |
| URL | string(256) | W | This parameter indicates a URL using which the CPE can get connected to the ACS through a CWMP protocol. This parameter needs to be a valid HTTP or HTTPS URL. The host part is used by the CPE to authenticate the license of the ACS when the SSL or TLS protocol is applied. The factory setting of this parameter may be recovered when the factory setting of the CPE is recovered. If the ACS has modified this value, the ACS needs to be capable of processing the default factory setting to which the value is recovered. | — | 1.0 |
| ... | | | | | |
| Connection Request URL | String(256) | — | The HTTP URL is used by the ACS to send a connection request to the CPE. The HTTP URL is in the format of http://host:port/path. The host part of a URL may be an IP address of a management interface. | — | 1.0 |
| ... | | | | | |
| Virtual management server of Internet gateway device | Object | — | This object includes parameters of the CPE-related ACS. | — | 1.0 |
| Enable | Boolean | | This parameter indicates whether to enable the virtual device data model. | | |

TABLE 2

| Name | Requirement(v1) | Requirement(v2) |
|---|---|---|
| InternetGateway Device.Queue-Management.Classification{i}. | PC | PC |
| ClassificationKey | R | R |
| ClassificationEnable | W | W |
| ClassificationStatus | R | R |
| ClassificationOrder | W | W |
| ClassInterface | W | W |
| DestIP | W | W |
| DestMask | W | W |
| DestIPExclude | W | W |
| SourceIP | W | W |
| SourceMask | W | W |
| SourceIPExclude | W | W |
| Protocol | W | W |
| ProtocolExclude | W | W |
| DestPort | W | W |
| DestPortRangeMax | W | W |
| DestPortExclude | W | W |
| SourcePort | W | W |
| SourcePortRangeMax | W | W |
| SourcePortExclude | W | W |
| SourceMACAddress | W | W |
| SourceMACExclude | W | W |
| DestMACAddress | W | W |
| DestMACExclude | W | W |
| DSCPCheck | W | W |
| DSCPExclude | W | W |
| DSCPMark | W | W |
| EthernetPriorityCheck | W | W |
| EthernetPriorityExclude | W | W |
| EthernetPriorityMark | W | W |
| VLANIDCheck | W | W |
| VLANIDExclude | W | W |
| ForwardingPolicy | W | W |
| TrafficClass | W | W |
| ClassPolicer | W | W |
| ClassQueue | W | W |

Step a5: The HGW receives information sent by the China Telecom ACS for adding the IPTV ACS information into an ACL of the QoS parameters in the HGW data model, and adds the IPTV ACS information into the ACL of the QoS parameters in the data model according to the received information.

Step a5 is similar to step a3. After the IPTV ACS information is added into the ACL of the QoS parameters in the data model, the IPTV ACS is entitled to access the QoS parameters in the data model in the HGW, and configure and manage the QoS parameters.

Also, similar to step a3, other methods may be applied for adding the IPTV ACS information into the ACL of the QoS parameters in the data model. For details, see the description in step a3.

Step a6: The HGW receives information sent by the China Telecom ACS for setting a parameter "Enable" in the virtual management server to "True", and sets the parameter "Enable" to "True" according to the received information.

The operations performed by the HGW in steps a1 to a6 may occur in the order described above, or in other orders. The order of occurrence of steps a1 to a6 can be adjusted to achieve the same effect.

Step a7: The HGW detects that the value of the parameter "Enable" is "True", and generates a virtual HGW according to the ACL information in the HOW.

In steps a1 to a7 above, the China Telecom ACS finishes the task of controlling the HGW to generate a virtual HGW. Now a virtual HGW exists in the HGW, and the virtual HGW can be configured and managed by the IPTV ACS according to the protocol agreed between the IPTV service provider and China Telecom.

Step A3: The virtual HGW or the IPTV ACS sets up a connection between the virtual HGW and the IPTV ACS.

The setup of the connection between the virtual HGW and the IPTV ACS may be initiated by the virtual HGW or the IPTV ACS. In the method of setting up the connection in step A3, the virtual HGW may be regarded as an independent HGW. Therefore, the connection between the virtual HGW and the IPTV ACS may be set up according to the prior art.

Step A4: The IPTV ACS configures and manages the virtual HGW according to the connection set up in step A3.

The virtual HGW in step A4 may be assumed as a physical HGW configured and managed by the IPTV ACS. Therefore, the IPTV ACS in step A4 can configure and manage the virtual HGW according to the prior art.

The foregoing description is intended for a scenario in which two servers manage one terminal, namely, the China Telecom ACS and the IPTV ACS manage one HGW. When ACSs of more services configure and manage one terminal, multiple virtual HGWs are generated in the HGW based on the same principles above.

In the method for enabling a terminal to be managed by multiple servers according to Embodiment 2, the HGW generates a virtual HGW according to the information received from the China Telecom ACS, and the virtual HGW can be configured and managed by the IPTV ACS. In this way, one HGW can be managed by multiple servers.

In the methods described in Embodiment 1 and Embodiment 2 above, a virtual HGW is generated based on the HGW so that multiple servers can manage one terminal. In Embodiment 3 described below, the range of the management servers is extended in the HGW directly so that multiple servers can manage one terminal.

Embodiment 3

Figure 6:
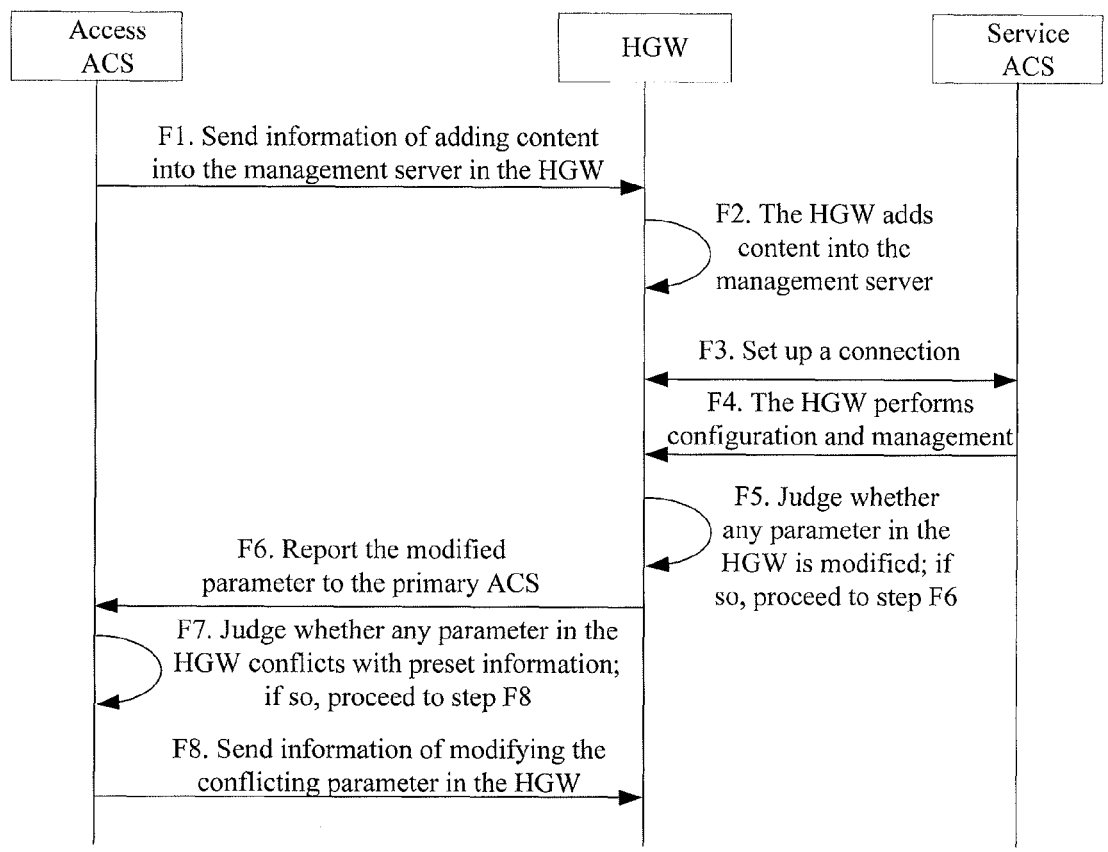
FIG. 6 is a flow chart of a method according to Embodiment 3 of the present invention.

As shown in FIG. 6, a method for enabling a terminal to be managed by multiple servers includes the following steps:

Step F1: An access ACS sends information of adding a service ACS capable of managing an HGW into a management server of the HGW according to a preset protocol agreed between the access ACS provider and the service ACS provider. The information about a primary ACS and the information of setting an access list attribute of parameters in a data model in the HGW are specified in the management server and sent to the HGW.

The service ACS information added in step F1 may be information about one service ACS, or information about multiple ACSs; the added service ACS information may be URL parameters of the service ACS; the primary ACS has the highest rights of managing and configuring the HGW; the access list attribute of the parameters indicates which servers or devices the parameters are accessible to, namely, defines the right of accessing the parameters in the data model in the HGW.

It should be noted that the primary ACS is entitled to access all parameters in the HGW.

The access ACS may send information of reporting a notification attribute to the HGW. The notification attribute specifies the mode for the HGW to report a parameter change message to the ACS corresponding to the access list attribute of a parameter after the parameter in the HGW changes. The value "1" of this attribute indicates immediate reporting, and the value "2" indicates reporting in the next session.

Step F2: The HGW receives the information sent by the access ACS in step F1, and adds the service ACS information into a list of the management server, adds a primary ACS, and sets the access list attribute of the parameters in the data model in the HGW according to the received information.

Step F3: The service ACS sets up a connection to the HGW.

The service ACS sets up the connection to the HGW in many ways. The setup of the connection may be initiated by the service ACS or the HGW. The process of setting up a connection between the ACS and the HGW is covered in the prior art.

Step F4: The service ACS configures and manages the HGW according to the service ACS information added in step F2 and the information of setting the access list attribute of the parameters in the data model in the HGW.

In steps F1 to F4, the service ACS configures and manages the HGW, and the access ACS may also configure and manage the HGW, and therefore, multiple servers can configure and manage one terminal. However, errors may occur when the foregoing method is practiced, and multiple servers are unable to configure and manage one terminal correctly in some circumstances. Therefore, the method may further include the following steps:

Step F5: The HGW configures and manages the HGW according to the service ACS information mentioned in step F4, and judges whether the parameters in the HGW are modified. If the parameters are modified, the procedure proceeds to step F6.

Step F6: The HGW reports a modified parameter to the service ACS specified in the access list attribute of the parameter.

If the access list attribute of the parameter in step F6 specifies multiple service ACSs, the HGW reports the modified parameter to every service ACS. Because the primary ACS has the highest right of configuring and managing all parameters in the HGW, it is deemed that the primary ACS is specified in the access list attribute of all parameters in the HGW.

Step F7: The primary ACS judges whether any conflict exists between the parameters in the HGW according to the modified parameter reported by the HGW and/or states of the parameters in the HGW which are monitored by the primary ACS. If any conflict exists, the procedure proceeds to step F8.

Step F8: The primary ACS modifies the parameters in the HGW according to the preset protocol agreed between the primary ACS provider and the service provider.

If no conflict exists between the parameters in the HGW modified in step F8, multiple service ACSs can configure one terminal.

In the description about the method for enabling a terminal to be managed by multiple servers according to Embodiment 3 above, the HGW is taken as an example of terminals. However, the HGW is only one type of CPE, and the terminals are not limited to the HGW.

In the method for enabling a terminal to be managed by multiple servers according to Embodiment 3, the data model in the HGW is extended so that more than one ACS can configure and manage the same HGW. In this way, multiple servers manage one terminal. In this HGW, a primary ACS is specified. According to the preset information and the modified parameters reported by the HGW, the primary ACS overcomes the conflict involved when multiple ACSs configure and manage one HGW.

Embodiment 4

Figure 7:
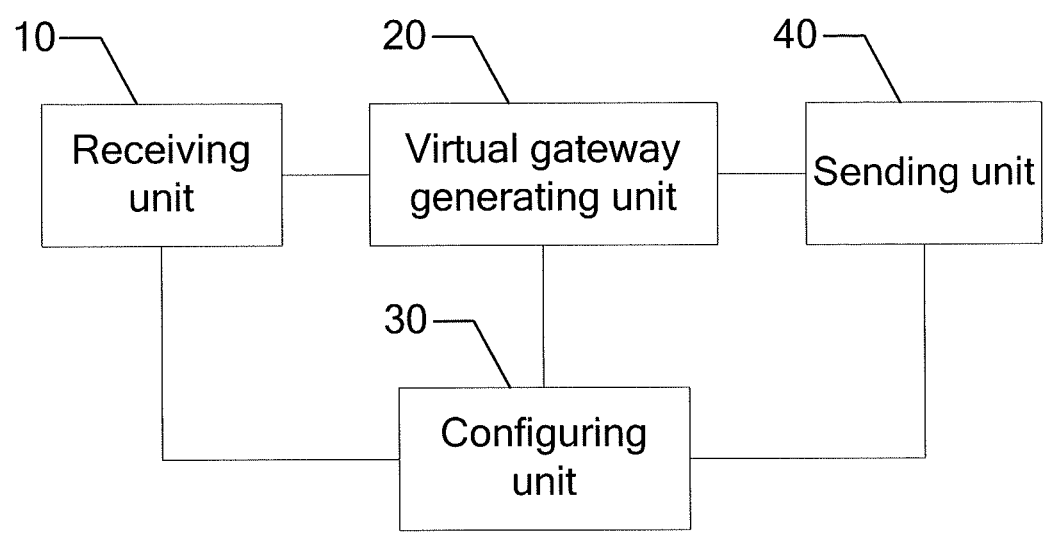
FIG. 7 shows logical units of a gateway according to Embodiment 4 of the present invention.

As shown in FIG. 7, a gateway includes:

a receiving unit 10, configured to receive information sent by an access ACS for exercising control to generate a virtual gateway, and receive configuration information sent by a service ACS;

a virtual gateway generating unit 20, configured to generate the virtual gateway according to the information received by the receiving unit 10; and a configuring unit 30, configured to configure and manage the generated virtual gateway according to the configuration information received by the receiving unit 10.

The gateway provided in Embodiment 4 may further include a sending unit 40, which is configured to send state information of the gateway to the access ACS and/or the service ACS according to an implementation result of the virtual gateway generating unit 20 and/or an implementation result of the configuring unit 30.

The foregoing description about the virtual gateway generating unit 20 is recapitulative. The following gives more details about the virtual gateway generating unit 20, assuming that an IPTV ACS configures a gateway provided in this embodiment under control of a China Telecom ACS. The IPTV ACS configures and manages QoS parameters of the gateway. The virtual gateway generating unit 20 is described below:

According to the information received by the receiving unit 10 and sent by the China Telecom ACS for adding a write right into the QoS parameter access list, the virtual gateway generating unit adds a write right of the IPTV ACS into the QoS parameter access list;

According to the information received by the receiving unit 10 from the China Telecom ACS as an instruction of adding a virtual management server object, adding a URL of the IPTV ACS, adding a URL of a connection request (referred to as "connection request URL" below), and adding a parameter "Enable", into the data model in the HGW, the virtual gateway generating unit adds the virtual management server object, the IPTV ACS URL, the connection request URL, and the parameter "Enable" into the data model in the HGW;

According to the information received by the receiving unit 10 and sent by the China Telecom ACS for adding IPTV ACS information into an ACL of the virtual management server in the HGW data model, the virtual gateway generating unit adds the IPTV ACS information into the ACL of the virtual management server in the data model;

According to the information received by the receiving unit 10 and sent by the China Telecom ACS for adding the QoS parameters which define the IPTV service, the virtual gateway generating unit records the received QoS parameters into a QoS list in the data model;

According to the information received by the receiving unit 10 and sent by the China Telecom ACS for adding IPTV ACS information into an ACL of QoS parameters in the HGW data model, the virtual gateway generating unit adds the IPTV ACS information into the ACL of the QoS parameters in the data model;

According to the information received by the receiving unit 10 and sent by the China Telecom ACS for setting a parameter "Enable" in the virtual management server to "True", the virtual gateway generating unit 20 sets the parameter "Enable" to "True"; and The virtual gateway generating unit 20 detects that the value of the parameter "Enable" is "True", and generates a virtual HGW according to the recorded ACL information.

Through the gateway provided in this embodiment, the receiving unit 10 receives information sent by the access ACS for controlling generation of a virtual gateway, and the virtual gateway generating unit 20 in the gateway generates the virtual gateway. It is deemed that a physical gateway independently configurable by the service ACS exists in the gateway. The receiving unit 10 receives information sent by the service ACS for configuring the virtual gateway, and the configuring unit 30 configures and manages the virtual gateway according to the received information of configuring the virtual gateway. The sending unit 40 may send information indicative of implementation state of the gateway to the access ACS or the service ACS.

Through the gateway provided in Embodiment 4, the information of generating a virtual gateway is received from the access ACS, and a virtual gateway is generated according to the information, and the service ACS configures and manages the virtual gateway. In this way, the gateway is configured and managed by multiple servers.

Embodiment 5

Figure 8:
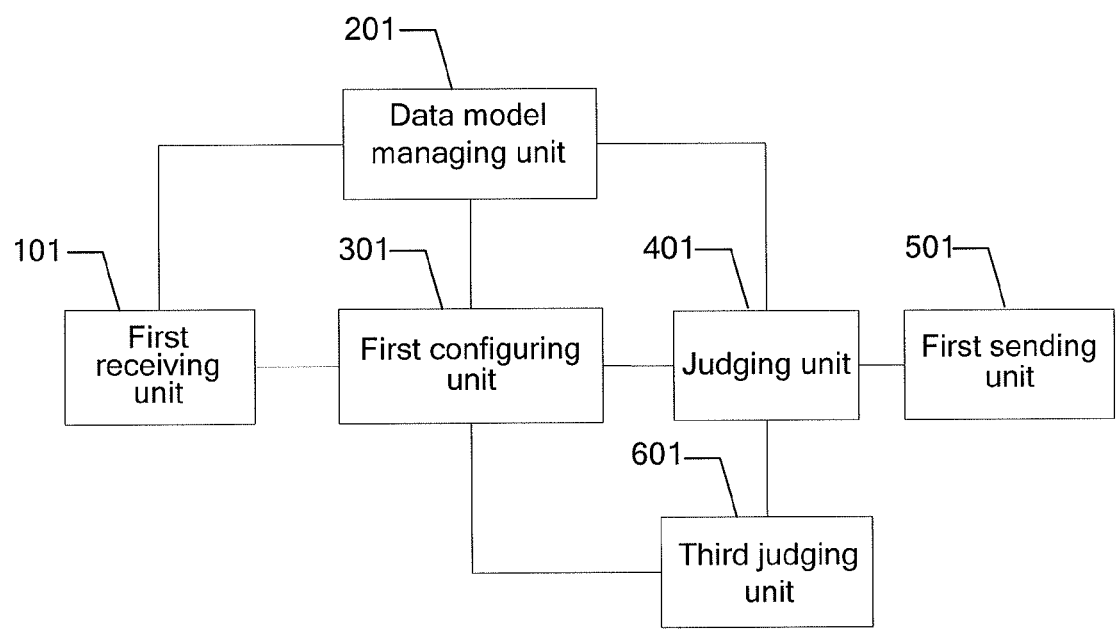
FIG. 8 shows logical units of a gateway according to Embodiment 5 of the present invention.

As shown in FIG. 8, a gateway different from the gateway Embodiment 4 includes a first receiving unit 101, a data model managing unit 201, and a first configuring unit 301. The gateway may further include a judging unit 401 and a first sending unit 501.

The first receiving unit 101 is configured to receive information of managing a data model in the gateway from an access ACS and receive information of configuring and managing the gateway from a service ACS;

The data model managing unit 201 is configured to manage the data model in the gateway according to the information received by the first receiving unit 101 for managing the data model in the gateway.

The information received for managing the data model in the gateway may be: Information of adding a service ACS capable of managing the HGW is added into a management server of the HGW; and information about a primary ACS and information of setting an access list attribute of parameters in the data model in the HGW are specified in the management server. The data model managing unit 201 modifies the data model according to the foregoing information.

The first configuring unit 301 is configured to configure and manage the gateway which has the data model managed by the data model managing unit 201 according to the configuration and management information received by the first receiving unit 101 from the service ACS.

The gateway with the foregoing logical units can be configured and managed by multiple servers. In some circumstances, a conflict occurs and makes it impracticable for multiple servers to configure and manage one gateway. To overcome such conflict, the gateway may further include a judging unit 401 and a first sending unit 501.

The judging unit 401 is configured to judge whether the parameters in the data model configured and managed by the first configuring unit 301 are modified; and, if the parameters in the data model configured and managed by the first configuring unit 301 are modified, notify the first sending unit.

The first sending unit 501 is configured to send parameters determined by the judging unit 401 as modified and values of the modified parameters to the server corresponding to the access list attribute of the parameters, where the server includes at least a primary ACS.

The gateway provided in this embodiment may further include a third judging unit 601, which is configured to judge whether the configured and managed parameters conflict with each other according to preset information when the judging unit 401 determines that the parameters are modified; if the parameters conflict with each other, the first configuring unit 301 is further configured to modify the conflicting parameters.

Through the gateway provided in Embodiment 5, the receiving unit 101 receives the information sent by the access ACS for managing the data model in the gateway, and the data model in the gateway is managed according to the received information. Therefore, the service ACS can configure and manage this gateway. With the judging unit 401 added in this embodiment, the gateway can report the parameters that are modified after being configured and managed to the primary ACS, and the primary ACS overcomes the conflict that occurs after the gateway is configured and managed according to preset information. The gateway provided in this embodiment can be configured and managed by multiple servers, and the modified parameters are reported to the servers, and therefore, the conflict that occurs when multiple servers configure one gateway is overcome.

Further, a server is provided. The server may be an access ACS such as an ACS provided by China Telecom. The following gives more details about the server.

Embodiment 6

Figure 9:
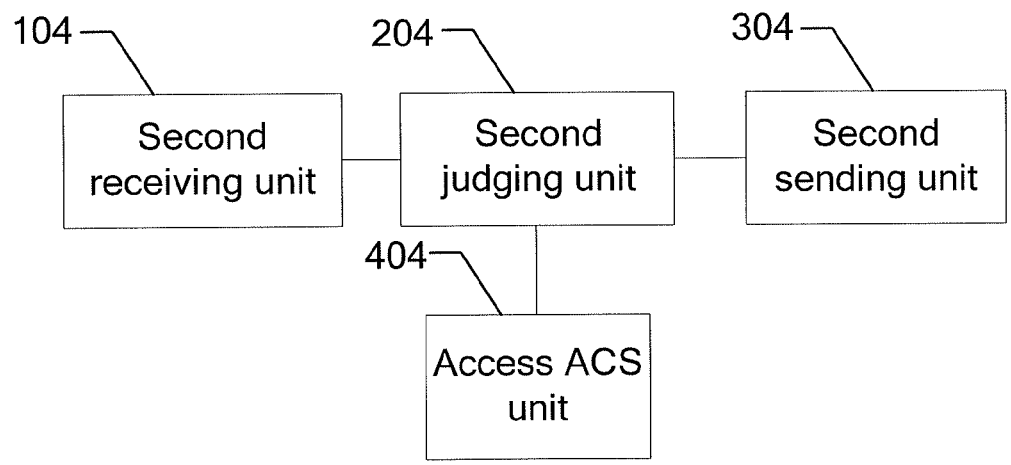
FIG. 9 shows logical units of a server according to Embodiment 6 of the present invention.

As shown in FIG. 9, a server includes a second receiving unit 104, a second judging unit 204, and a second sending unit 304. The server may further include an access ACS unit 404.

The second receiving unit 104 is configured to receive modified parameters and values of the modified parameters from a gateway;

The second judging unit 204 is configured to: judge whether the modified parameters in the gateway conflict with each other according to preset information and the received values of modified parameters; and, if the modified parameters in the gateway conflict with each other, notify the second sending unit 304; and The second sending unit 304 is configured to send information of modifying the parameters in the gateway to the gateway according to the preset information.

The preset information used in the second judging unit 204 and the second sending unit 304 may be information about the protocol agreed between the primary ACS provider and another service provider, and the information specifies the values of the parameters. When a modified parameter conflicts with this protocol information, the second sending unit sends the information of modifying the parameter to the gateway.

The server may be an access ACS. Therefore, the server may further include an access ACS unit, which is configured to provide the function of accessing the ACS.

The server described above judges whether a modified parameter reported by the gateway conflicts with preset information, and modifies the conflicting parameter. Therefore, the server overcomes the conflict that occurs when multiple servers configure and manage one gateway.

Embodiment 7

Figure 10:
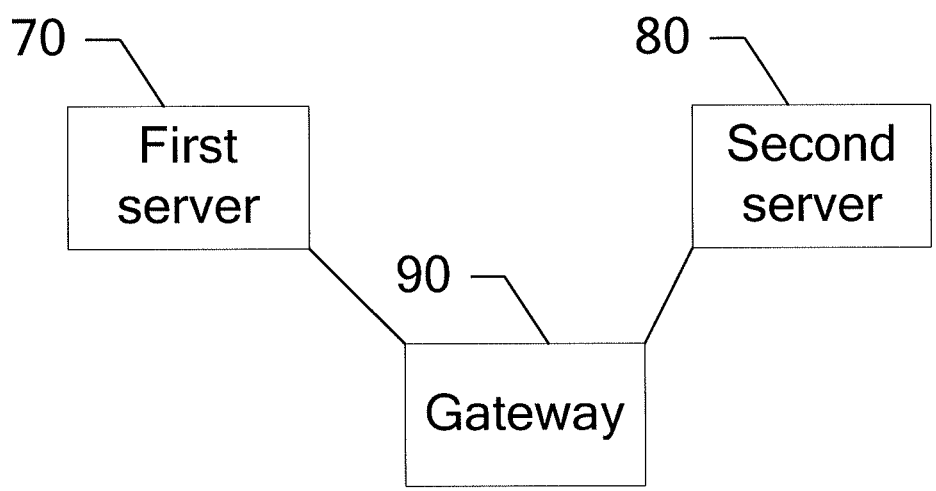
FIG. 10 is a logical diagram of a communication system according to Embodiment 7 of the present invention.

As shown in FIG. 10, a communication system includes a first server 70, a second server 80, and a gateway 90.

The first server 70 is configured to: configure and manage the gateway 90 with respect to services of the server, send information of managing a data model in the gateway, and judging whether a received modified parameter in the gateway conflicts with preset information according to the preset information and the received modified parameter; and send information of modifying the parameter in the gateway to the gateway if the conflict exists;

The gateway 90 is configured to: accept configuration and management performed by the first server 70, receive the information sent by the first server for managing the data model in the gateway, and modify the data model in the gateway; accept configuration and management performed by the second server 80, send modified parameters and values of the modified parameters to servers specified in an access list attribute of preset parameters, where the specified servers include at least the first server 70; receive information sent by the first server 70 for modifying the parameters in the gateway, and modify the parameters in the data model; and The second server 80 is configured to: configure and manage the gateway 90 with respect to the services of the server, and receive information about the modified parameters from the gateway 90 if the access list attribute preset in the modified parameters of the gateway specifies that the modified parameters need to be reported to the second server 80 once the parameters are modified.

The first server 70 may be an access ACS, and may be the server provided in Embodiment 6; the second server 80 may be an ACS that provides a service, which is briefly known as a service ACS; and the system in the system provided in Embodiment 7 may include multiple service ACSs. The multiple ACSs configure and manage the gateway 90 according to different services provided by them.

The gateway 90 may be the gateway provided in Embodiment 5. The gateway described in this embodiment is only one type of CPE. The technical solutions of the present invention do not limit the type of the terminal, and the terminals other than the gateway can work in a similar way to accomplish the same effect.

Expounded above are a method, an apparatus and a communication system for enabling a terminal to be managed by multiple servers under the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for enabling a terminal to be managed by multiple servers, comprising:
   receiving, by the terminal, configuration information sent by a first server;
   generating, by the terminal, a virtual device according to the configuration information received from the first server;
   receiving management information from a second server;
   managing the virtual device according to the management information received from the second server; and
   generating, by the terminal, additional virtual devices,
   wherein the virtual device and each of the additional virtual devices corresponds to a different one of the multiple servers,
   wherein each one of the multiple servers is configured to manage the terminal using its corresponding virtual device,
   wherein the virtual device and each of the additional virtual devices comprises a data model,
   wherein each data model comprises service-related parameters and objects that are negotiated by a service provider and an access provider,
   wherein the service-related parameters and objects comprise Network Address Translation (NAT) mapping table entries, Quality of Service (QoS) parameters, and a Uniform Resource Locator (URL) of a management server,
   wherein the QoS parameters are recorded in a QoS list in the data model, and
   wherein the QoS parameters comprise a queue management parameter and a classification parameter.

2. The method according to claim 1, wherein the terminal comprises parameters and functions, wherein the virtual device comprises all or a part of the parameters of the terminal, and wherein the virtual device comprises all or a part of the functions of the terminal.

3. The method according to claim 1, wherein the configuration information sent by the first server comprises information about an address of the second server.

4. The method according to claim 1, wherein managing the virtual device according to the management information received from the second server comprises modifying parameters of the terminal according to the management information.

5. A gateway, comprising:
   a receiving unit configured to receive information for managing a data model in the gateway from a first server and receive information for configuring and managing the gateway from a second server;
   a data model managing unit configured to manage the data model in the gateway according to the information received by the receiving unit for managing the data model; and
   a configuring unit configured to configure and manage the gateway which has the data model managed by the data model managing unit according to the information for configuring and managing the gateway received by the receiving unit from the second server,
   wherein the data model comprises service-related parameters and objects that are negotiated by a service provider and an access provider,
   wherein the service-related parameters and objects comprise Network Address Translation (NAT) mapping table entries, Quality of Service (QoS) parameters, and a Uniform Resource Locator (URL) of a management server,
   wherein the QoS parameters define an Internet Protocol Television (IPTV) service,
   wherein the QoS parameters are recorded in a QoS list in the data model, and
   wherein the QoS parameters comprise a queue management parameter and a classification parameter.

6. The gateway according to claim 5, further comprising:
   a judging unit configured to determine whether a parameter is modified in the data model after the configuration and management is performed; and
   a sending unit configured to send information about the parameter to the first server when the judging unit determines that the parameter is modified.

7. The gateway according to claim 6, further comprising a second judging unit configured to judge whether the parameter conflicts with preset information when the judging unit determines that the parameter is modified, and wherein the configuring unit is further configured to modify the parameter when the second judging unit determines that the parameter conflicts with the preset information.

8. The gateway according to claim 5, wherein the first server comprises an access Auto-Configuration Server (ACS), wherein the second server comprises a service ACS, and wherein the receiving unit receives instructions from the access ACS to add a virtual management server object, a URL of the service ACS, a URL of a connection request, and an enable parameter to the data model of the gateway.

9. The gateway according to claim 5, wherein the data model comprises an access list that indicates which servers or devices have access to parameters in the data model.

10. The method according to claim 1, further comprising defining access rights of each of the multiple servers in an access list of the terminal, wherein the access list specifies one of the multiple servers as a primary server, and wherein the primary server has access rights to all parameters of the terminal.

11. The method according to claim 10, further comprising receiving, by the terminal from the primary server, an instruction to modify one of the parameters of the terminal according to a preset protocol.

12. The method according to claim 10, further comprising receiving, by the terminal from the primary server, an instruction to modify one of the parameters of the terminal to resolve a parameter conflict.

* * * * *